(12) United States Patent
Hu et al.

(10) Patent No.: US 12,387,139 B2
(45) Date of Patent: Aug. 12, 2025

(54) PASSIVE OUTLIER-TOLERANT AND ACTIVE OUTLIER-TOLERANT LEARNING METHOD WITH ABNORMAL SAMPLES AND SYSTEM THEREOF

(71) Applicant: Guangdong University of Petrochemical Technology, Maoming (CN)

(72) Inventors: Shaolin Hu, Maoming (CN); Jinpeng Chen, Maoming (CN); Ye Ke, Maoming (CN); Naiquan Su, Maoming (CN); Shihua Wang, Maoming (CN)

(73) Assignee: GUANGDONG UNIVERSITY OF PETROCHEMICAL TECHNOLOGY, Maoming (CN)

( * ) Notice: Subject to any disclaimer, the term of this patent is extended or adjusted under 35 U.S.C. 154(b) by 611 days.

(21) Appl. No.: 17/897,702

(22) Filed: Aug. 29, 2022

(65) Prior Publication Data
US 2024/0078464 A1     Mar. 7, 2024

(51) Int. Cl.
*G06N 20/00*     (2019.01)

(52) U.S. Cl.
CPC .................... *G06N 20/00* (2019.01)

(58) Field of Classification Search
CPC ....................................................... G06N 20/00
See application file for complete search history.

(56) References Cited

U.S. PATENT DOCUMENTS

| | | | |
|---|---|---|---|
| 9,830,558 B1 * | 11/2017 | Chaudhuri | H04L 67/02 |
| 10,147,049 B2 * | 12/2018 | Chari | G06N 20/20 |
| 10,846,308 B2 * | 11/2020 | Miller | G06N 20/00 |
| 11,222,046 B2 * | 1/2022 | Zhang | G06N 20/20 |
| 11,227,232 B2 * | 1/2022 | Chari | H04L 63/1425 |
| 11,593,650 B2 * | 2/2023 | Zhang | G06N 3/08 |
| 11,636,125 B1 * | 4/2023 | Carmona Perez | G06N 3/08 707/736 |
| 12,088,600 B1 * | 9/2024 | Beauchesne | G06N 5/01 |

OTHER PUBLICATIONS

Keyi et al. "Status and Prospect of Fault & Outlier-Tolerant Techniques and Development," 2017 IEEE pp. 425-428.*
Jiang et al. "Outlier Detection Approaches Based on Machine Learning in the Internet-of-Things," 2020 IEEE, pp. 53-59.*

* cited by examiner

*Primary Examiner* — Maikhanh Nguyen
(74) *Attorney, Agent, or Firm* — Chun-Ming Shih; LANWAY IPR SERVICES

(57) ABSTRACT

The present disclosure relates to a passive outlier-tolerant and active outlier-tolerant learning method with abnormal samples and a system thereof. The method includes the following steps: (1) judging the distribution of abnormal samples in a train set, and calling a corresponding outlier-tolerant algorithm based on the distribution to carry out feature learning on the sample feature quantity in the train set to obtain an outlier-tolerant learning result; (2) training an initial learning model by using the outlier-tolerant learning result to obtain an intermediate learning model; (3) processing the test set by a preset outlier-correction algorithm to obtain an outlier-corrected test set; (4) testing the intermediate learning model using the outlier-corrected test set to obtain a final learning model. The scheme of the present disclosure can improve the passive outlier tolerance and active outlier tolerance of a machine learning process to abnormal samples.

7 Claims, 5 Drawing Sheets

PASSIVE OUTLIER-TOLERANT AND ACTIVE OUTLIER-TOLERANT LEARNING METHOD WITH ABNORMAL SAMPLES AND SYSTEM THEREOF

TECHNICAL FIELD

The present disclosure relates to the technical field of artificial intelligence machine learning, in particular to a passive outlier-tolerant and active outlier-tolerant learning method with abnormal samples and a system thereof.

BACKGROUND

Due to the widespread existence and application of big data, knowledge is acquired efficiently through machine learning, which has gradually become the main driving force for the development of machine learning technology at this stage. How to deeply analyze complex and diverse data based on machine learning and make more efficient use of information more efficiently has become the main direction of machine learning research in the current big data environment. Machine learning is increasingly developing towards intelligent data analysis and has become an important source of the technology of analyzing intelligent data.

For both learning from examples and learning through observation and discovery, the research and application of machine learning are inseparable from data or samples. However, due to the influence of various uncertain factors such as sampling error, recording error or environmental mutation, outliers are inevitable in the sample data used for machine learning, especially in big data. The existence of abnormal samples not only affects the learning process, but also affects the learning results, and even leads to serious deviations or errors. Therefore, before the machine learning of sample data, it is usually required to clean the sample data to realize the identification and processing of abnormal samples.

It is well known that machine learning refers to the process of computer simulating or realizing human learning behavior, and acquiring knowledge and skills through learning, so as to realize intelligent behavior and improve self-performance. Human learning behavior is outlier-tolerant. When the learning object or learning example (sample) is occasionally wrong, the human brain can automatically "shield" the occasional errors in the object and sample under normal circumstances, and the occasional errors should not lead to wrong understanding, wrong judgment or wrong countermeasures. For example, when the human brain distinguishes "banana" from "apple", the "banana" cannot be mistakenly identified as an "apple" owing to a small amount of "mango" mixed in the fruit box, and vice versa. Similarly, when the human brain learns knowledge, such as animal picture recognition, a wrong cognition of "cats", "dogs" and "goats" is formed because a large number of pictures of "cats" and "dogs" are mixed with a few pictures of "goats".

As far as machine learning is concerned, the outlier tolerance is also extremely important and necessary to make it have the learning ability and cognitive ability similar to that of human brain. In the context of machine learning, the outlier tolerance means that the machine learning method cannot be adversely affected by a small amount of abnormal data (or "outliers") that may exist in the sample set. Specifically, in the learning process, it is hoped to explore and develop the machine learning method with outlier tolerance, so that knowledge is not "learned by mistake" because of possible outliers and abnormal samples in the training sample set, and wrong test conclusions is not given because of possible outliers and abnormal samples in the test sample set.

In the related technical solutions, up to now, there has not been a general solution to identify outliers, let alone a machine learning solution with outlier tolerance. Some of existing learning models and testing methods need to know the number of outlier points or the proportion of abnormal data in advance, and some of existing learning models and testing methods need to know the statistical distribution model and model parameters that the sample obeys in general in advance. Even so, the adverse effects of outliers and abnormal data cannot be avoided, and the outlier tolerance for sample outliers and abnormal data is lacked. Even a small amount of outliers and abnormal data leads to regression deviation and clustering deviation.

SUMMARY

At least to some extent, in order to overcome the problems in related technologies that machine learning schemes cannot effectively identify outliers in training data, and the existing schemes have poor passive outlier tolerance and active outlier tolerance, the present disclosure provides a passive outlier-tolerant and active outlier-tolerant learning method with abnormal samples and a system thereof.

According to a first aspect of the embodiment of the present disclosure, a passive outlier-tolerant and active outlier-tolerant learning method with abnormal samples is provided, which comprises the following steps:

acquiring a train set and a test set;

judging the distribution of abnormal samples in the train set, and calling a corresponding outlier-tolerant algorithm based on the distribution to carry out feature learning on the sample feature quantity in the train set to obtain an outlier-tolerant learning result;

training an initial learning model by using the outlier-tolerant learning result to obtain an intermediate learning model;

processing the test set by a preset outlier-correction algorithm to obtain an outlier-corrected test set; and testing the intermediate learning model using the outlier-corrected test set to obtain a final learning model.

According to a second aspect of the embodiment of the present disclosure, a passive outlier-tolerant and active outlier-tolerant learning system with abnormal samples is provided, comprising:

an acquiring module, which is configured to acquire a train set and a test set;

an outlier-tolerant fault-tolerant learning module, which is configured to judge the distribution of abnormal samples in the train set, and call a corresponding outlier-tolerant algorithm based on the distribution to carry out feature learning on the sample feature quantity in the train set to obtain an outlier-tolerant learning result;

a training module, which is configured to train an initial learning model by using the outlier-tolerant learning result to obtain an intermediate learning model;

an outlier-correcting module, which is configured to process the test set by a preset outlier-correction algorithm to obtain an outlier-corrected test set; and a testing module, which is configured to test the intermediate learning model using the outlier-corrected test set to obtain a final learning model.

The technical scheme provided by the embodiment of the present disclosure has the following beneficial effects.

The scheme of the present disclosure provides a practical outlier-tolerant design method for a multi-dimensional sample feature learning process and a test set-oriented outliers correcting method for abnormal samples, which can improve the passive outlier tolerance and active outlier tolerance of a machine learning method to abnormal samples, and realize data cleaning of multi-dimensional samples and outlier-tolerant extraction of feature information, so as to ensure the reliability of machine learning and the correctness of knowledge acquisition, and avoid the machine from learning knowledge by mistake due to abnormal samples or being misled by abnormal samples.

It should be understood that the above general description and the following detailed description are exemplary and explanatory only, and do not limit the present disclosure.

BRIEF DESCRIPTION OF THE DRAWINGS

The drawings herein are incorporated into and constitute a part of the specification, illustrate embodiments consistent with the present disclosure, and together with the specification, serve to explain the principle of the present disclosure.

FIG. 3-1 is a schematic diagram of normal sample distribution without outliers shown in an embodiment of the present disclosure and an elliptic curve of sample distribution error.

FIG. 3-2 is a diagram of sample distribution with outliers shown in an embodiment of the present disclosure and an elliptic curve of sample distribution error drawn by a conventional learning method.

FIG. 3-3 is diagram of sample distribution with outliers shown in an embodiment of the present disclosure and an elliptic curve of sample distribution error drawn by a learning method of the present disclosure.

FIG. 3-4 is a diagram of sample distribution with outliers shown in another embodiment of the present disclosure and an elliptic curve of sample distribution error drawn by a learning method of the present disclosure.

DETAILED DESCRIPTION OF THE EMBODIMENTS

Exemplary embodiments will be described in detail here, examples of which are shown in the accompanying drawings. When the following description refers to the drawings, unless otherwise indicated, the same numbers in different drawings indicate the same or similar elements. The embodiments described in the following exemplary embodiments do not represent all the embodiments consistent with the present disclosure. On the contrary, the embodiments are only examples of methods and devices consistent with some aspects of the present disclosure as detailed in the appended claims.

In view of the above reasons, the present disclosure establishes a set of simple and practical outlier-tolerant design methods for a multi-dimensional sample feature learning process and test set-oriented outliers correcting methods for abnormal samples, which can improve the passive outlier tolerance and active outlier tolerance of a machine learning method to abnormal samples, and realize data cleaning of multi-dimensional samples and outlier-tolerant extraction of feature information, so as to ensure the reliability of machine learning and the correctness of knowledge acquisition, and avoid the machine from learning knowledge by mistake due to abnormal samples or being misled by abnormal samples.

Figure 1:
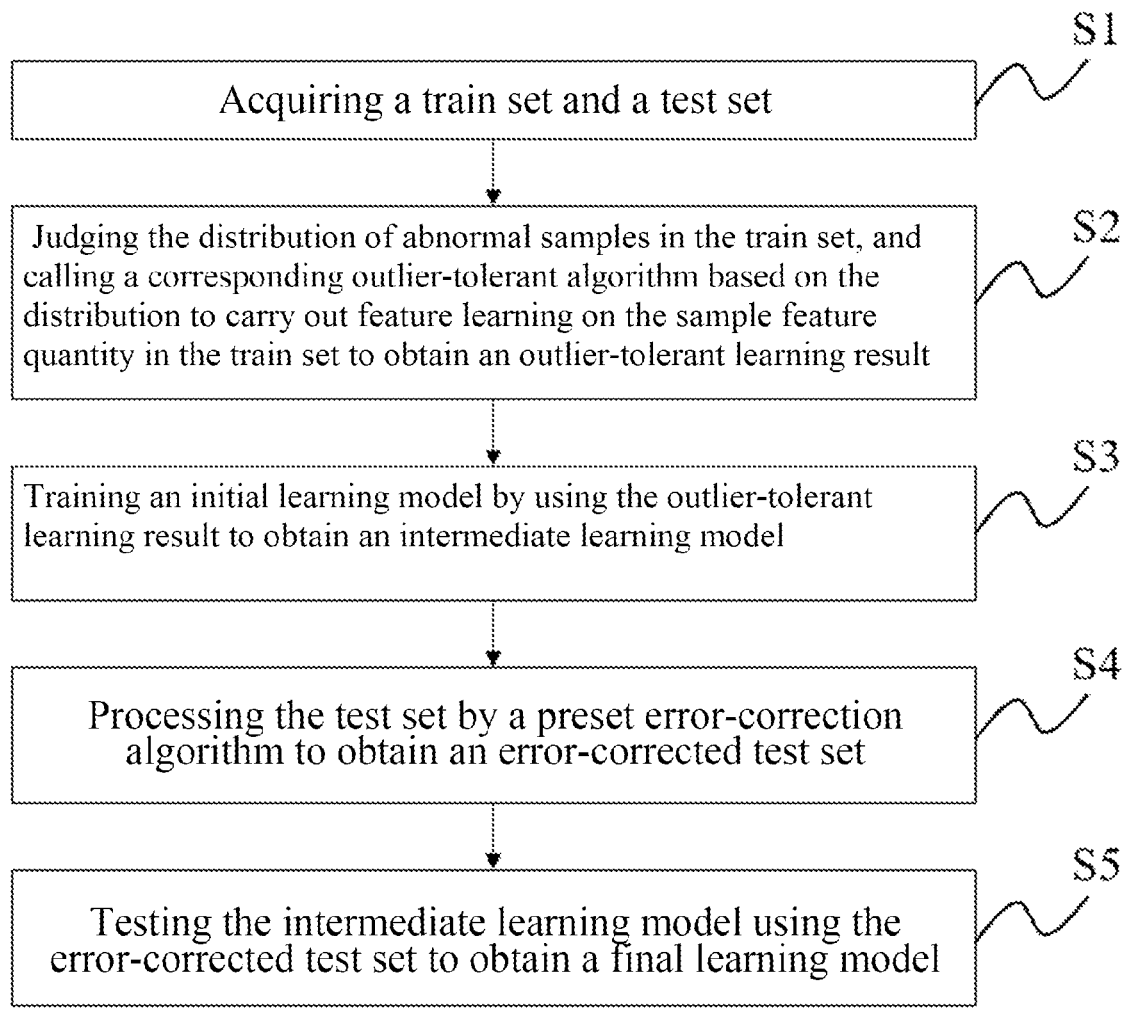
FIG. 1 is a flowchart of a passive outlier-tolerant and active outlier-tolerant learning method with abnormal samples according to an exemplary embodiment.

FIG. 1 is a flowchart of a passive outlier-tolerant and active outlier-tolerant learning method with abnormal samples according to an exemplary embodiment. The method can comprise the following steps:

S1, acquiring a train set and a test set;

S2, judging the distribution of abnormal samples in the train set, and calling a corresponding outlier-tolerant algorithm based on the distribution to carry out feature learning on the sample feature quantity in the train set to obtain an outlier-tolerant learning result;

S3, training an initial learning model by using the outlier-tolerant learning result to obtain an intermediate learning model;

S4, processing the test set by a preset outlier-correction algorithm to obtain an outlier-corrected test set; and S5, testing the intermediate learning model using the outlier-corrected test set to obtain a final learning model.

The scheme of the present disclosure provides a practical outlier-tolerant design method for a multi-dimensional sample feature learning process and a test set-oriented outliers correcting method for abnormal samples, which can improve the passive outlier tolerance and active outlier tolerance of a machine learning method to abnormal samples, and realize data cleaning of multi-dimensional samples and outlier-tolerant extraction of feature information, so as to ensure the reliability of machine learning and the correctness of knowledge acquisition, and avoid the machine from learning knowledge by mistake due to abnormal samples or being misled by abnormal samples.

It should be understood that although the steps in the flowchart of FIG. 1 are shown in sequence as indicated by arrows, these steps are not necessarily executed in sequence as indicated by arrows. Unless explicitly stated the present disclosure, the execution of these steps is not strictly limited in order, and these steps can be executed in other order. Furthermore, at least a part of the steps in FIG. 1 may comprise a plurality of sub-steps or stages, which are not necessarily completed at the same time, but may be executed at different times. The execution order of these sub-steps or stages is not necessarily executed in sequence, but may be executed with other steps or at least a part of sub-steps or stages of other steps in turn or alternately.

Figure 2:
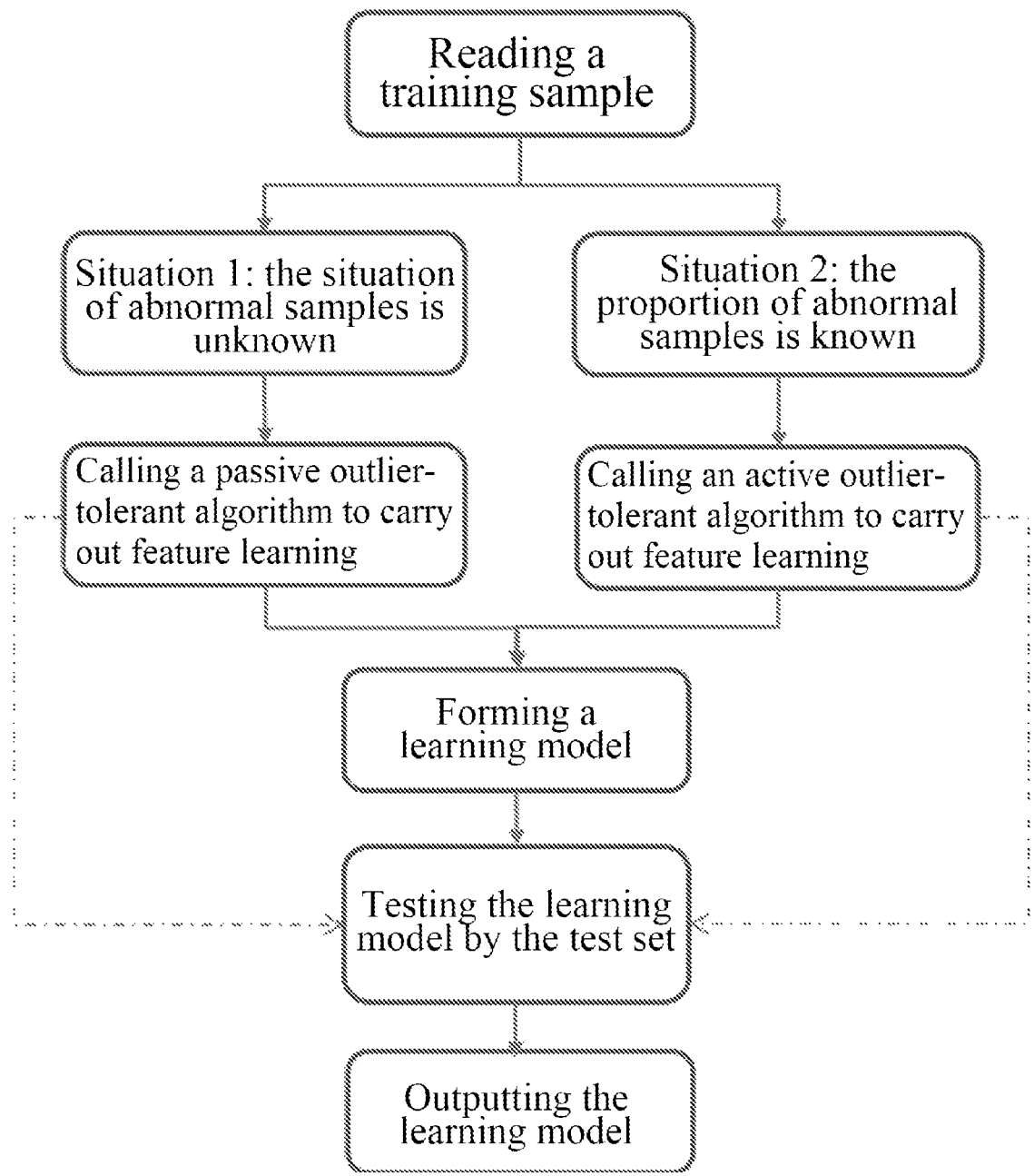
FIG. 2 is a schematic diagram of a design and test logic of an outlier-tolerant machine learning algorithm according to an exemplary embodiment.

In order to make the purpose, technical scheme and advantage of the present disclosure clearer, the embodiment of the present disclosure will be described in further detail hereinafter with reference to the specific implementation process shown in FIG. 2.

According to the embodiment of the present disclosure, in step S2, calling a corresponding outlier-tolerant algorithm based on the distribution to carry out feature learning on the sample feature quantity in the train set specifically comprises the following steps: if the distribution of abnormal samples is unknown, calling the passive outlier-tolerant algorithm to carry out feature learning on the sample feature quantity; if the distribution of abnormal samples is known, calling the active outlier-tolerant algorithm to carry out feature learning on the sample feature quantity.

In the process of designing machine learning methods, samples are usually divided into two parts: a train set $S_I$ and a test set $S_{II}$, in which the train set is used to train knowledge learning or learning models, and the test set is used to test and verify the knowledge or models acquired by learning. Therefore, the present disclosure is divided into two parts: 1. outlier-tolerant learning of the train set; 2. error correction of the test set.

1.1. The passive outlier-tolerant learning for statistical characteristics of multi-dimensional samples oriented at the train set with impurity.

When the train set $S_I$ may contain outliers or abnormal data, the present disclosure establishes a passive outlier-tolerant learning method for statistical characteristics of multi-dimensional samples.

In practical application, the passive outlier-tolerant algorithm specifically comprises the following steps: constructing an M-learning mechanism, wherein the M-learning mechanism comprises a function binary group; constructing a function binary group with outlier tolerance to abnormal information brought by abnormal samples; solving an optimal outlier-tolerant estimator based on the M-learning mechanism for the feature quantity in the train set $S_I$.

The core idea is as follows: denoting the set formed by n p-dimensional samples as $S_I=\{X_i \in R^p, i=1, 2, \ldots, n\}$, in which the population expected value or mean value $\mu \in R^p$ and the scatter matrix $\Sigma \in R^{p \times p}$ of its important features involves $P=2p+C_p^2$ parameters. The key to outlier-tolerant learning of these features is to construct such a learning method, which can eliminate the adverse effects of outliers and abnormal data possibly contained in the set $S_I$ and ensure that the learning results are not distorted by the influences of outliers and abnormal data. Therefore, an M-learning mechanism is constructed.

$$\begin{cases} \sum_{i=1}^{n} \phi_\mu\left(d^2\left(X_i, \hat{\mu}_n^\phi, \hat{\Sigma}_n^\phi\right)\right)(X_i - \hat{\mu}_n^\phi) = 0 \\ \sum_{i=1}^{n} \phi_\eta\left(d^2\left(X_i, \hat{\mu}_n^\phi, \hat{\Sigma}_n^\phi\right)\right)(X_i - \hat{\mu}_n^\phi)(X_i - \hat{\mu}_n^\phi)^\tau = n\hat{\Sigma}_n^\phi \end{cases} \quad (1)$$

where $d^2(X, \mu, \Sigma)=(X-\mu)^\tau \Sigma^{-1}(X-\mu)$, $\{\phi_\mu, \phi_\eta\}$ is a real function binary group on the set $R^+=[0, +\infty)$ Generally, for any training sample whose population distribution F is absolute continuous ellipsoidal symmetric distribution, if $f^x(r)$ is denoted as the density function of F, and three functions are selected as the following:

$$\phi_\mu(r) = \phi_\eta(r) = -\frac{2r f^{x'}(r)}{f^x(r)}, \quad \phi_\delta(r) \cong 1 \quad (2)$$

The obtained $(\hat{\mu}_n^\phi, \hat{\Sigma}_n^\phi)$ is the maximum likelihood estimation of the feature quantity $(\mu, \Sigma)$. If the population distribution of the training sample is unknown, but the sample are Independent And Identifiably Distributed (IID), if $\phi_\mu(r)=\phi_\eta(r)=1$ is selected, the obtained $(\hat{\mu}_n^\phi, \hat{\Sigma}_n^\phi)$ is the second-order moment optimal unbiased estimation of the feature quantity $(\mu, \Sigma)$, as shown in formula (3):

$$\hat{\mu}_n = \frac{1}{n}\sum_{i=1}^{n} X_i, \quad \hat{\Sigma}_n = \frac{1}{n-1}\sum_{i=1}^{n}(X_i - \hat{\mu}_n)(X_i - \hat{\mu}_n)^\tau \quad (3)$$

It can be seen that the M-learning mechanism is essentially a collection of several learning methods, including at least the commonly used maximum likelihood method and the second-order moment estimation method. With the different methods of selecting the real function binary group $\{\phi_\mu, \phi_\eta\}$, the learning results with different effects can be obtained. However, both maximum likelihood estimation and second-order moment estimation lack the outlier tolerance to abnormal samples or outliers. Once there is an abnormal sample in the training sample set $S_I$, the estimated value $(\hat{\mu}_n^\phi, \hat{\Sigma}_n^\phi)$ of the feature quantity $(\mu, \Sigma)$ given by the above learning model deviates from the true value, thus forming knowledge cognition.

Function design: in order to select a learning mechanism with outlier tolerance from the M-learning mechanisms, a function binary group having the following form with outlier tolerance to abnormal information brought by abnormal samples is constructed.

$$\phi_\mu(r) = \begin{cases} 1, & r \in [0, r_0] \\ \frac{c-r}{c-r_0}, & r \in (r_0, c] \\ 0, & r > c \end{cases}; \quad \phi_\eta(r) = \begin{cases} 1, & r \in [0, r_0] \\ \frac{r_0 c}{c-r_0}\left(\frac{1}{r} - \frac{1}{c}\right), & r \in (r_0, c] \\ 0, & r > c \end{cases} \quad (4)$$

where $r_0$ and c are adjustable parameters, and the default values are $r_0=3p$, $c=3r_0$.

Iterative calculation: in the actual learning of the feature quantity $(\mu, \Sigma)$, solving the optimal outlier-tolerant estimator $(\hat{\mu}_n^\phi, \hat{\Sigma}^\phi(F_n))$ by formula (1) involves solving multivariable nonlinear equations, denoting the component $X_i \in R^p$ as the form of $(x_1(t_i), \ldots, x_p(t_i))^\tau$, denoting the median operator as $$\underset{i}{\mathrm{med}},$$

and the initial iterative value is selected.

$$\begin{cases} \hat{\mu}_0 = \left(\underset{i=1,\ldots,n}{\mathrm{med}} \{x_1(t_i)\}, \ldots, \underset{i=1,\ldots,n}{\mathrm{med}} \{x_p(t_i)\}\right)^\tau \\ \hat{\Sigma}_0 = 1.483 \, \mathrm{diag}\left\{\underset{i=1,\ldots,n}{\mathrm{med}}\left\{\left|x_1(t_i) - \underset{i=1,\ldots,n}{\mathrm{med}} \{x_1(t_i)\}\right|\right\}, \ldots, \underset{i=1,\ldots,n}{\mathrm{med}} \right. \\ \left. \left\{\left|x_p(t_i) - \underset{i=1,\ldots,n}{\mathrm{med}} \{x_p(t_i)\}\right|\right\}\right\} \end{cases} \quad (5)$$

The iterative algorithm is constructed as the following $$\begin{cases} \hat{\mu}_{k+1} = \sum_{i=1}^{n} \tilde{\phi}_\mu(X_i, \hat{\mu}_k, \hat{\Sigma}_k)\hat{\Sigma}_k^{-1/2}(X_i - \hat{\mu}_k) \\ \hat{\Sigma}_{k+1} = \frac{1}{n}\sum_{i=1}^{n} \tilde{\phi}_\eta(X_i, \hat{\mu}_k, \hat{\Sigma}_k)(X_i - \hat{\mu}_k)(X_i - \hat{\mu}_k)^\tau \end{cases} \quad (k = 0, 1, 2, \ldots) \quad (6)$$

so as to realize the optimal passive outlier-tolerant learning of sample features $(\mu, \Sigma)$ through iterative calculation.

1.2. The active outlier-tolerant learning for statistical characteristics of multi-dimensional samples based on a train set with impurity.

The design ideas of active outlier-tolerant learning and passive outlier-tolerant learning are different. Passive outlier tolerance is to compress or control the influence of abnormal samples through the ingenious design of the learning algorithm, so as to achieve correct and reliable feature learning, while active outlier tolerance is to directly eliminate or exclude suspicious samples, so as to achieve correct and reliable feature learning.

In practical application, the active outlier-tolerant algorithm specifically comprises the following steps: preliminarily learning the feature quantity $(\mu, \Sigma)$ using all the samples in the train set $S_I$ to obtain $(\tilde{\mu}_I, \tilde{\Sigma}_I)$; sorting all the samples in the train set $S_I$ by Euclidean distance, calculating the Euclidean distance based on $(\tilde{\mu}_I, \tilde{\Sigma}_I)$, and sorting from small to large to obtain a partial ordered set of samples; taking 90% of the samples on the left of partial order relation, and carrying out secondary learning based on a real integer operator to obtain $(\hat{\mu}_I, \hat{\Sigma}_I)$; repeating the above Euclidean distance sorting and secondary learning process using $(\hat{\mu}_I, \hat{\Sigma}_I)$ instead of $(\tilde{\mu}_I, \tilde{\Sigma}_I)$, and obtaining a revised active outlier-tolerant learning result.

For the active outlier-tolerant learning of multi-dimensional sample feature quantity $(\mu, \Sigma)$, because the outliers and other abnormal samples are usually unknown, the proportion or on which samples the outliers and other abnormal samples occur is unknown. Therefore, active outlier-tolerant learning is realized by four steps.

Step 201, all samples participate in learning. The feature quantity $(\mu, \Sigma)$ are preliminarily learned using all the samples in the train set $S_I$, and the specific method is as follows $$\tilde{\mu}_I = \frac{1}{n}\sum_{i=1}^{n} X_i, \quad \tilde{\Sigma}_I = \frac{1}{n-1}\sum_{i=1}^{n}(X_i - \tilde{\mu}_I)(X_i - \tilde{\mu}_I)^\tau \quad (7)$$

Step 202, the Euclidean metric (Euclidean metric is also known as Euclidean distance) of all the samples is sorted. For all the samples in the train set $S_I$, the Euclidean metric $d_i = (X_i - \tilde{\mu}_I)^\tau \tilde{\Sigma}_I^{-1}(X_i - \tilde{\mu}_I)$ based on $(\tilde{\mu}_I, \tilde{\Sigma}_I)$ is calculated, and the samples are sorted from small to large to obtain a partial ordered set of samples, which is as follows:

$$X_{(i)} \prec \ldots \prec X_{(n)} \quad (8)$$

Step 203, 90% of the samples participate in learning. 90% of points on the left of partial order relation shown in formula (8) are used, the real integer operator is [ . . . ], and the feature quantity leaning is carried out in a similar way to formula (7).

$$\hat{\mu}_I = \frac{1}{[0.9n]}\sum_{i=1}^{[0.9n]} X_{(i)}, \quad \hat{\Sigma}_I = \frac{1}{[0.9n]-1}\sum_{i=1}^{[0.9n]}(X_{(i)} - \hat{\mu}_I)(X_{(i)} - \hat{\mu}_I)^\tau \quad (9)$$

Step 204, learning results are revised. Return to Step 202, repeat Step 202 and Step 203 using $(\hat{\mu}_I, \hat{\Sigma}_I)$ instead of $(\tilde{\mu}_I, \tilde{\Sigma}_I)$, and a revised active outlier-tolerant learning result $(\hat{\mu}_I, \hat{\Sigma}_I)$ is obtained.

2. The outlier-tolerant testing and outliers correction oriented at the test set with impurity.

In the process of machine learning, in order to obtain a good learning algorithm, both the train set and the test set are indispensable. The train set is mainly used to train models and determine parameters, and form knowledge learning models and methods. The test set is used to test the learning models and methods and test their generalization ability. The test set plays an important role in shaping learning models and popularizing learning methods.

In the embodiment of the present disclosure, step S4 processes the test set through a preset outlier-correction algorithm, which specifically comprises the following steps: dividing the test set $S_{\|}$ into two parts: a support set $S_{IIS}$ and an exclusion set $S_{IIA}$; for any sample $X_i \in S_{IIA}$, carrying out error correction repair on $X_i$ by a preset outlier-tolerant proportional compression algorithm, and placing the outlier-corrected and repaired sample back into the test set $S_{\|}$ to obtain the outlier-corrected test set.

If outliers or abnormal data exist the samples in the test set, the wrong objects (samples) are used to test machine learning, and the test results obtained are biased in high probability. To solve this problem, the test set $S_{\|}$ is divided into two parts: a "support set" $S_{\|S}$ and an "exclusion set" $S_{\|A}$ using an "eliminating" strategy or an "avoiding" strategy, and the exclusion index is constructed.

$$I_{IIA} = \frac{|S_{IIA}|}{|S_{II}|} \times 100\% \quad (10)$$

From the size of $I_{IIA}$, the coincidence degree between the learning model and the test set samples can be intuitively judged.

The determination of the exclusion set: for any sample $X_i \in S_{II}$ when the sample is a valid sample that obeys normal distribution $N(\mu_{II}, \Sigma_{II})$, $(X_i - \mu)^\tau \Sigma^{-1}(X_i - \mu) \sim \chi^2(p)$. Therefore, the sample mean value obtained from the train set and the estimated value $(\hat{\mu}_n^\phi, \hat{\Sigma}^\phi(F_n))$ of a scatter matrix is used to construct a confidence ellipsoid:

$$Q_{II} = \{X_i \in R^p | (X_i - \hat{\mu}_n^\phi)^\tau \{\hat{\Sigma}^\phi(F_n)\}^{-1}(X_i - \hat{\mu}_n^\phi) \le \chi_\alpha^2(p)\} \quad (11)$$

where $\chi_\alpha^2(p)$ is the $(1-\alpha) \times 100\%$ quantile of $\chi^2$–distribution (available from the distribution table), and the constant $\alpha$ is 0.05 or 0.01. The formula (11) can realize dividing the "support set" $S_{IIS}$ and the "exclusion set" $S_{IIA}$ of the test set $S_{II}$, which are as follows:

$$S_{IIS} = S_{II} \cap Q_{II}, S_{IIA} = S_{II} - S_{IIS} \quad (12)$$

By combining formula (12) with formula (11), the coincidence rate $I_{IIS}$ and the exclusion rate $I_{IIA}$ of the optimal outlier-tolerant learning $(\hat{\mu}_n^\phi, \hat{\Sigma}^\phi(F_n))$ of the multivariate sample feature quantity $(\mu, \Sigma)$ in a given test set $S_{II}$ can be obtained as follows:

$$I_{IIS} = \frac{|S_{II} \cap Q_{II}|}{|S_{II}|} \times 100\%, \quad I_{IIA} = (1 - I_{IIS}) \times 100\% \quad (13)$$

The important factor affecting the above division is as follows: whether the learning results $(\hat{\mu}_n^\phi, \hat{\Sigma}^\phi(F_n))$ of the feature parameters of the train set are consistent with the mean value and the scatter matrix of the samples of the test set $S_{II}$. Therefore, for two groups of samples $\{X_i^a \in S_I\}$ and $\{X_i^b \in S_{II}\}$ from the train set and the test set, the original hypothesis is constructed for the two groups of samples:

$$H_0: \mu = \mu_{II}, \Sigma = \Sigma_{II} \quad (14)$$

The sample sizes of $\{X_i^a \in S_I\}$ and $\{X_i^b \in S_{II}\}$ are denoted as n and m, and the mean values are $\overline{X}^a$ and $\overline{X}^b$, respectively. The likelihood ratio test statistics of the original hypothesis $H_0$ are constructed, $$\lambda_4 = \frac{\sqrt{(n+m)^{p(n+m)}}}{\sqrt{n^{pn}m^{pm}}} \left\{ \frac{\left|\sum_{i=1}^{n}(X_i^a - \overline{X}_i^a)(X_i^a - \overline{X}_i^a)^\tau\right|^n \left|\sum_{i=1}^{m}(X_i^b - \overline{X}_i^b)(X_i^b - \overline{X}_i^b)^\tau\right|^m}{\left|\sum_{i=1}^{n}(X_i^a - \overline{X}_i^a)(X_i^a - \overline{X}_i^a)^\tau + \sum_{i=1}^{m}(X_i^b - \overline{X}_i^b)(X_i^b - \overline{X}_i^b)^\tau\right|^{n+m}} \right\}^{1/2} \quad (15)$$

and a negative domain is constructed. When the statistics are $\lambda_4 \leq c_4^\alpha$, the original hypothesis $H_0$ can be accepted with confidence $(1-\alpha)\times 100\%$.

The sample covariance matrices of the train set $\{X_i^a \in S_I\}$ and the test set $\{X_i^b \in S_{II}\}$ are denoted as $\Sigma^a$ and $\Sigma^b$, respectively, and the likelihood ratio test statistics can be rewritten by formula (15) as follows $$\lambda_4 = \sqrt{\frac{(n_1+n_2)^{p(n_1+n_2)}}{n_1^{pn_1} n_2^{pn_2}} \frac{\left|(n_1-1)\sum^a\right|^{n_1}\left|(n_2-1)\sum^b\right|^{n_2}}{\left|(n_1-1)\sum^a + (n_2-1)\sum^b\right|^{n_1+n_2}}} \quad (16)$$

The outlier-tolerant statistics $\hat{\Sigma}^\phi(F_{n_1}^a)$ and $\hat{\Sigma}^\phi(F_{n_2}^b)$ of covariance matrices are used instead of the sample covariance in formula (16), so as to obtain the modified $\lambda_4$ test statistics with error tolerance to outliers and other abnormal data.

$$\tilde{\lambda}_4 = \sqrt{\frac{(n_1+n_2)^{p(n_1+n_2)}(n_1-1)^{n_1}(n_2-1)^{n_2}}{n_1^{pn_1} n_2^{pn_2}}} \left\{ \frac{\left|\hat{\sum}^\phi (F_{n_1}^a)\right|^{n_1}\left|\hat{\sum}^\phi (F_{n_2}^b)\right|^{n_2}}{\left|(n_1-1)\hat{\sum}^\phi (F_{n_1}^a) + (n_2-1)\hat{\sum}^\phi (F_{n_2}^b)\right|^{n_1+n_2}} \right\}^{1/2} \quad (17)$$

When the statistics are $\tilde{\lambda}_4 \leq c_4^\alpha$, the original hypothesis $H_0$ can be accepted.

Considering the important role of the test set in the process of machine learning and deep learning, the "exclusion set" $S_{IIA}$ is directly eliminated from the test set $S_{II}$, which leads to the continuous shrinking of the test set and information loss. Therefore, it is necessary to establish an error correction and repair algorithm for abnormal data. Specifically, for any $X_i \in S_{IIA}$, this section establishes an outlier-tolerant proportional compression method $$\tilde{X}_i = \hat{\mu}_n^\phi + \frac{X_\alpha^2(p)}{(X_i - \hat{\mu}_n^\phi)^\tau \left\{\hat{\sum}^\phi (F_{n_2}^b)\right\}^{-1}(X_i - \hat{\mu}_n^\phi)}(X_i - \hat{\mu}_n^\phi) \quad (18)$$

It is not difficult to verify that $\tilde{X}_i \in S_{IIS}$ for any $X_i \in S_{IIA}$. Therefore, the compression transformation formula (18) can place all the samples of the exclusion set back to the set $S_{IIS}$ by compression, and realize the error correction and repair of the abnormal samples. It should be particularly noted that the error correction and repair method can only be used when the number $|S_{IIA}|$ of samples in the set $S_{IIA}$ is significantly less than $|S_{IIS}|$.

Figures 1, 3:
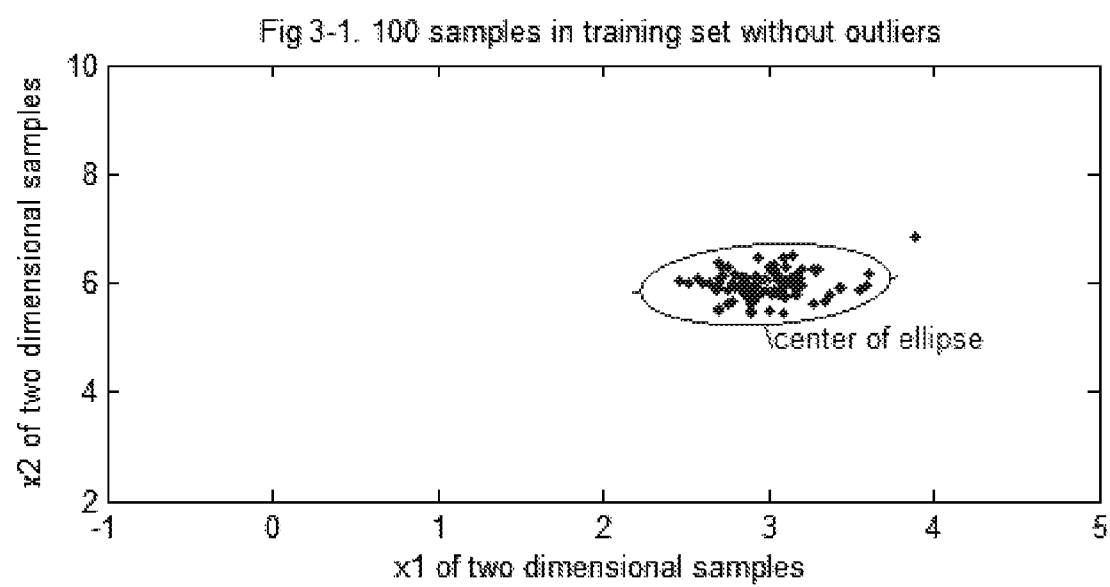
Figures 2, 3:
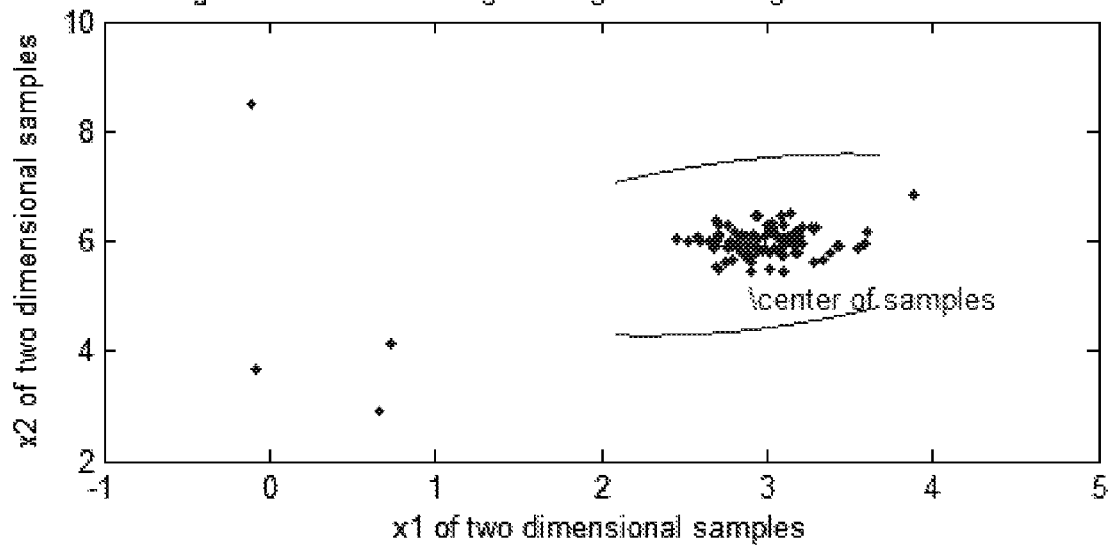
Figure 3:
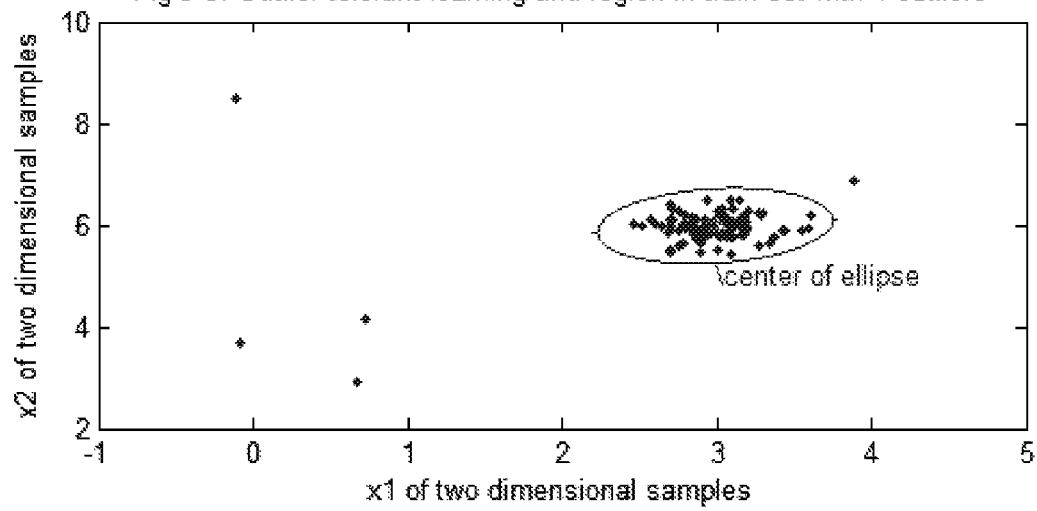

As shown in FIG. 3, 100 groups of two-dimensional normal samples are selected, and the distribution is shown in FIG. 3-1, in which the asterisk is the machine learning result of the sample feature quantity, and the ellipse is the sample distribution domain. Four points in the above 100 groups of samples are biased to form four outlier points. FIG. 3-2 is a diagram of sample distribution with outliers in FIG. 3-1 and an elliptic curve of sample distribution error drawn by a conventional learning method. FIG. 3-3 is the elliptic curve of feature quantity and distribution error obtained after 100 groups of samples with 4 abnormal data have been subjected to outlier-tolerant machine learning in FIG. 3-2. When comparing FIG. 3-1, FIG. 3-2, and FIG. 3-3, it can be clearly seen that due to the influence of abnormal samples, the distribution error ellipse shown in FIG. 3-2 is obviously deformed compared with the distribution domain shown in FIG. 3-1, indicating that the conventional machine learning algorithm lacks outlier tolerance for abnormal data. The distribution error ellipse shown in FIG. 3-3 is obviously better than the error ellipse shown in FIG. 3-2, and is close to the error ellipse shown in FIG. 3-1, which proves that the outlier-tolerant machine learning method of the present disclosure can effectively overcome the adverse effects of abnormal samples and improve the accuracy and reliability of machine feature learning.

Figures 3, 4:
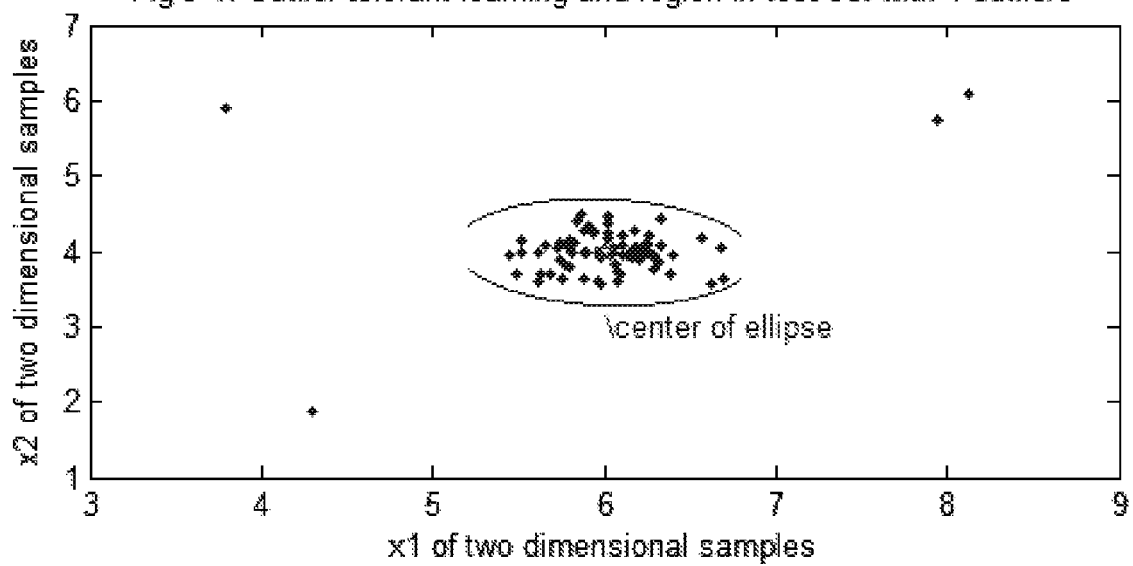

FIG. 3-4 shows the application of the above outlier-tolerant learning method to the 80-point test set which also contains 4 abnormal samples. As can be seen from FIG. 3-4, the outlier-tolerant machine learning successfully passed the outlier tolerance test, and the error ellipse is hardly adversely affected by the abnormal samples.

The embodiment of the present disclosure further provides the passive outlier-tolerant and active outlier-tolerant learning system with abnormal samples, which comprises an acquiring module, an outlier-tolerant learning module, a training module, an outlier-correcting module and a testing module.

The acquiring module is configured to acquire a train set and a test set.

The outlier-tolerant learning module is configured to judge the distribution of abnormal samples in the train set, and call a corresponding outlier-tolerant algorithm based on the distribution to carry out feature learning on the sample feature quantity in the train set to obtain an outlier-tolerant learning result.

The training module is configured to train an initial learning model by using the outlier-tolerant learning result to obtain an intermediate learning model.

The outlier-correcting module is configured to process the test set by a preset outlier-correction algorithm to obtain an outlier-corrected test set.

The testing module is configured to test the intermediate learning model using the outlier-corrected test set to obtain a final learning model.

In the embodiment of the present disclosure, the outlier-tolerant learning module is specifically configured to execute the following steps: if the distribution of abnormal samples is unknown, calling the passive outlier-tolerant algorithm to carry out feature learning on the sample feature quantity; if the distribution of abnormal samples is known, calling the active outlier-tolerant algorithm to carry out feature learning on the sample feature quantity.

In practical application, the passive outlier-tolerant algorithm specifically comprises the following steps: constructing an M-learning mechanism, wherein the M-learning mechanism comprises a function binary group; constructing a function binary group with outlier tolerance to abnormal information brought by abnormal samples; solving an optimal outlier-tolerant estimator based on the M-learning mechanism for the feature quantity in the train set $S_I$.

The M-learning mechanism is as follows:

$$\begin{cases} \sum_{i=1}^n \phi_\mu \left( d^2\left(X_i, \hat{\mu}_n^\phi, \widehat{\sum}_n^\phi\right)\right)(X_i - \hat{\mu}_n^\phi) = 0 \\ \sum_{i=1}^n \phi_\eta \left( d^2\left(X_i, \hat{\mu}_n^\phi, \widehat{\sum}_n^\phi\right)\right)(X_i - \hat{\mu}_n^\phi)(X_i - \hat{\mu}_n^\phi)^\tau = n\widehat{\sum}_n^\phi \end{cases};$$

where $d^2(X, \mu, \Sigma) = (X-\mu)^\tau \Sigma^{-1}(X-\mu)$, $\{\phi_\mu, \phi_\eta\}$ is a real function binary group on the set $R^+ = [0, +\infty)$;

the function binary group with outlier tolerance is:

$$\phi_\mu(r) = \begin{cases} 1, & r \in [0, r_0] \\ \frac{c-r}{c-r_0}, & r \in (r_0, c] \\ 0, & r > c \end{cases}; \phi_\eta(r) = \begin{cases} 1, & r \in [0, r_0] \\ \frac{r_0 c}{c-r_0}\left(\frac{1}{r} - \frac{1}{c}\right), & r \in (r_0, c] \\ 0, & r > c \end{cases};$$

where $r_0$ and $c$ are adjustable parameters, and the default values are $r_0 = 3p$, $c = 3r_0$.

In practical application, the active outlier-tolerant algorithm specifically comprises the following steps: preliminarily learning the feature quantity $(\mu, \Sigma)$ using all the samples in the train set $S_I$ to obtain $(\tilde{\mu}_I, \tilde{\Sigma}_I)$; sorting all the samples in the train set $S_I$ by Euclidean distance, calculating the Euclidean distance based on $(\tilde{\mu}_I, \tilde{\Sigma}_I)$, and sorting from small to large to obtain a partial ordered set of samples; taking 90% of the samples on the left of partial order relation, and carrying out secondary learning based on a real integer operator to obtain $(\hat{\mu}_I, \hat{\Sigma}_I)$; repeating the above Euclidean distance sorting and secondary learning process using $(\hat{\mu}_I, \hat{\Sigma}_I)$ instead of $(\tilde{\mu}_I, \tilde{\Sigma}_I)$, and obtaining the revised active outlier-tolerant learning results.

The specific step of the preliminary learning comprises:

$$\tilde{\mu}_I = \frac{1}{n}\sum_{i=1}^n X_i, \tilde{\sum}_I = \frac{1}{n-1}\sum_{i=1}^n (X_i - \tilde{\mu}_I)(X_i - \tilde{\mu}_I)^\tau;$$

the specific step of the secondary learning comprises:

$$\hat{\mu}_I = \frac{1}{[0.9n]}\sum_{i=1}^{[0.9n]} X_{(i)}, \hat{\sum}_I = \frac{1}{[0.9n]-1}\sum_{i=1}^{[0.9n]} (X_{(i)} - \hat{\mu}_I)(X_{(i)} - \hat{\mu}_I)^\tau;$$

where [ . . . ] is a real integer operator.

In the embodiment of the present disclosure, the outlier-correcting module is specifically configured to execute the following steps: dividing the test set $S_{II}$ into two parts: a support set $S_{IIS}$ and an exclusion set $S_{IIA}$; for any sample $X_i \in S_{IIA}$, carrying out error correction repair on $X_i$ by a preset outlier-tolerant proportional compression algorithm, and placing the outlier-corrected and repaired sample back into the test set $S_{II}$ to obtain the outlier-corrected test set.

In practical application, dividing the test set $S_{II}$ into two parts: a support set $S_{IIS}$ and an exclusion set $S_{IIA}$ specifically executes the following steps: for any sample $X_i \in S_{II}$, when the sample is a valid sample that obeys normal distribution $N(\mu_{II}, \Sigma_{II})$, $(X_i - \mu)^\tau \Sigma^{-1}(X_i - \mu) \sim \chi^2(p)$; using the sample mean value obtained from the train set and the estimated value $(\hat{\mu}_n^\phi, \hat{\Sigma}^{\phi(F_n)})$ of a scatter matrix to construct a confidence ellipsoid:

$$Q_{II} = \{X_i \in R^p | (X_i - \hat{\mu}_n^\phi)^\tau \{\hat{\Sigma}^\phi(F_n)\}^{-1}(X_i - \hat{\mu}_n^\phi) \leq \chi_\alpha^2(p)\}$$

where $\chi_\alpha^2(p)$ is the $(1-\alpha) \times 100\%$ quantile of $\chi^2$–distribution, and the constant $\alpha$ is 0.05 or 0.01; $S_{IIS} = S_{II} \cap Q_{II}$, $S_{IIA} = S_{II} - S_{IIS}$.

The preset outlier-tolerant proportional compression algorithm specifically comprises:

$$\tilde{X}_i = \hat{\mu}_n^\phi + \frac{\chi_\alpha^2(p)}{(X_i - \hat{\mu}_n^\phi)^\tau \left\{\hat{\sum}^\phi (F_{n_2}^b)\right\}^{-1}(X_i - \hat{\mu}_n^\phi)}(X_i - \hat{\mu}_n^\phi).$$

With regard to the system in the above embodiment, the specific steps of operation executed by each module have been described in detail in the embodiment of the method, which will not be described in detail. Each module in the passive outlier-tolerant and active outlier-tolerant learning system can be realized in whole or in part by software, hardware and the combination thereof. The above modules can be embedded in or independent of the processor in the computer device in the form of hardware, or can be stored in the memory in the computer device in the form of software, so that the processor can call and execute the corresponding operations of the above modules.

It can be understood that the same or similar parts in the above embodiments can refer to each other, and the contents not explained in detail in some embodiments can refer to the same or similar contents in other embodiments.

It should be noted that in the description of the present disclosure, the terms "first" and "second" are only used for the purpose of description, and cannot be understood as indicating or implying relative importance. In addition, in the description of the present disclosure, unless otherwise stated, the meaning of "a plurality of" means at least two.

Any process or method description in the flow chart or otherwise described here can be understood as a module, segment or part of a code that comprises one or more executable instructions for implementing steps of specific logical functions or processes, and the scope of the preferred embodiments of the present disclosure includes other implementations, in which functions can be performed out of the order shown or discussed, including in a substantially simultaneous manner or in a reverse order according to the functions involved, which should be understood by those skilled in the art to which the embodiments of the present disclosure belong.

It should be understood that various parts of the present disclosure can be implemented by hardware, software, firmware or the combination thereof. In the above embodiments, a plurality of steps or methods can be implemented by software or firmware stored in a memory and executed by a suitable instruction execution system. For example, if the steps or methods are implemented by hardware, as in another embodiment, the steps or methods can be implemented by any one of the following technologies known in the art or the combination thereof: a discrete logic circuit with a logic gate for realizing logic functions on data signals, an application specific integrated circuit with appropriate combined logic gates, a Programmable Gate Array (PGA), a Field Programmable Gate Array (FPGA), etc.

Those skilled in the art can understand that all or part of the steps involved in implementing the above embodiment method can be completed by instructing related hardware through a program, which can be stored in a computer-readable storage medium. When being executed, the program comprises one or a combination of the steps of the method embodiment.

In addition, each functional unit in each embodiment of the present disclosure may be integrated in one processing module, each unit may exist physically alone, or two or more units may be integrated in one module. The above integrated modules can be realized in the form of hardware or in the form of a software functional module. If the integrated module is implemented in the form of a software functional module and sold or used as an independent product, the integrated module can also be stored in a computer-readable storage medium.

The storage medium mentioned above can be a read-only memory, a magnetic disk or an optical disk, etc.

In the description of this specification, the description referring to the terms "one embodiment", "some embodiments", "examples", "specific examples" or "some examples" means that the specific features, structures, materials or characteristics described in connection with this embodiment or example are included in at least one embodiment or example of the present disclosure. In this specification, the schematic expressions of the above terms do not necessarily refer to the same embodiment or example. Furthermore, the specific features, structures, materials or characteristics described may be combined in any one or more embodiments or examples in a suitable manner.

Although the embodiments of the present disclosure have been shown and described above, it can be understood that the above embodiments are illustrative and should not be construed as limitations of the present disclosure, and those skilled in the art can make changes, modifications, substitutions and variations to the above embodiments within the scope of the present disclosure.

What is claimed is:

1. A passive outlier-tolerant and active outlier-tolerant learning method with abnormal samples, comprising:
   a. acquiring, by one or more processors, a train set and a test set;
   b. judging, by the one or more processors, a distribution of abnormal samples in the train set, and calling a corresponding outlier-tolerant algorithm based on the distribution of the abnormal samples to carry out feature learning on a sample feature quantity in the train set to obtain an outlier-tolerant learning result;
   c. training, by the one or more processors, an initial learning model by using the outlier-tolerant learning result to obtain an intermediate learning model;
   d. processing, by the one or more processors, the test set by a preset outlier-correction algorithm to obtain an outlier-corrected test set; and
   e. testing, by the one or more processors, the intermediate learning model using the outlier-corrected test set to obtain a final learning model;
   wherein calling a corresponding outlier-tolerant algorithm based on the distribution to carry out feature learning on the sample feature quantity in the train set specifically comprises the following steps:

if the distribution of abnormal samples is unknown, calling the passive outlier-tolerant algorithm to carry out feature learning on the sample feature quantity;
   if the distribution of abnormal samples is known, calling the active outlier-tolerant algorithm to carry out feature learning on the sample feature quantity;
   wherein the passive outlier-tolerant algorithm specifically comprises the following steps:
   constructing an M-learning mechanism, wherein the M-learning mechanism comprises a function binary group;
   constructing a function binary group with outlier tolerance to abnormal information brought by abnormal samples;
   solving an optimal outlier-tolerant estimator based on the M-learning mechanism for the feature quantity in the train set $S_1$;
   wherein the M-learning mechanism is:

$$\begin{cases} \sum_{i=1}^{n} \phi_\mu \left( d^2\left(X_i, \hat{\mu}_n^\phi, \hat{\Sigma}_n^\phi\right)\right)(X_i - \hat{\mu}_n^\phi) = 0 \\ \sum_{i=1}^{n} \phi_\eta \left( d^2\left(X_i, \hat{\mu}_n^\phi, \hat{\Sigma}_n^\phi\right)\right)(X_i - \hat{\mu}_n^\phi)(X_i - \hat{\mu}_n^\phi)^\tau = n\hat{\Sigma}_n^\phi \end{cases} ;$$

where $d^2(X,\mu,\Sigma)=(X-\mu)^\tau \Sigma^{-1}(X-\mu)$, $\{\phi_\mu, \phi_\eta\}$ is a real function binary group on $R^+=[0,+\infty)$; and the function binary group with outlier tolerance is:

$$\phi_\mu(r) = \begin{cases} 1, & r \in [0, r_0] \\ \frac{c-r}{c-r_0}, & r \in (r_0, c] \\ 0, & r > c \end{cases} ; \phi_\eta(r) = \begin{cases} 1, & r \in [0, r_0] \\ \frac{r_0 c}{c-r_0}\left(\frac{1}{r} - \frac{1}{c}\right), & r \in (r_0, c] \\ 0, & r > c \end{cases}$$

where $r_0$ and $c$ are adjustable parameters, and the default values are $r_0=3p, c=3r_0$.

2. The method according to claim 1, wherein the active outlier-tolerant algorithm specifically comprises the following steps:
   preliminarily learning the feature quantity $(\mu, \Sigma)$ using all the samples in the train set $S_1$ to obtain $(\tilde{\mu}_1, \tilde{\Sigma}_1)$;
   a. sorting all the samples in the train set $S_1$ by Euclidean distance, calculating the Euclidean distance based on $(\tilde{\mu}_1, \tilde{\Sigma}_1)$, and sorting from small to large to obtain a partial ordered set of samples;
   b. taking 90% of the samples on the left of partial order relation, and carrying out secondary learning based on a real integer operator to obtain $(\hat{\mu}_1, \hat{\Sigma}_1)$;
   c. repeating the above Euclidean distance sorting and secondary learning process using $(\hat{\mu}_1, \hat{\Sigma}_1)$ instead of $(\tilde{\mu}_1, \tilde{\Sigma}_1)$, and obtaining a revised active outlier-tolerant learning result.

3. The method according to claim 2, wherein the specific step of the preliminary learning comprises:

$$\tilde{\mu}_I = \frac{1}{n}\sum_{i=1}^{n} X_i, \quad \tilde{\Sigma}_I = \frac{1}{n-1}\sum_{i=1}^{n}(X_i - \tilde{\mu}_I)(X_i - \tilde{\mu}_I)^\tau;$$

and the specific step of the secondary learning comprises:

$$\hat{\mu}_I = \frac{1}{[0.9n]} \sum_{i=1}^{[0.9n]} X_{(i)}, \hat{\sum}_I = \frac{1}{[0.9n]-1} \sum_{i=1}^{[0.9n]} (X_{(i)} - \hat{\mu}_I)(X_{(i)} - \hat{\mu}_I)^T;$$

where [ . . . ] is a real integer operator.

4. The method according to claim 1, wherein processing the test set by a preset outlier-correction algorithm specifically comprises the following steps:
  a. dividing the test set $S_{\parallel}$ into two separated parts: a support set $S_{\parallel S}$ and an exclusion set $S_{\parallel A}$;
  b. for any sample $X_i \in S_{IIA}$, carrying out error correction repair on $X_i$ by a preset outlier-tolerant proportional compression algorithm, and placing the outlier-corrected and repaired sample back into the test set Su to obtain the outlier-corrected test set.

5. The method according to claim 4, wherein dividing the test set Su into two parts: a support set $S_{\parallel S}$ and an exclusion set $S_{\parallel A}$ specifically comprises the following steps:
  for any sample $X_i \in S_{\parallel}$, when the sample is a valid sample that obeys normal distribution $N(\mu_u, \Sigma_u)$, $(X_i-\mu)^T\Sigma^{-1}(X_i-\mu) \sim \chi^2(p)$;
  using the sample mean value obtained from the train set and the estimated value $(\hat{\mu}_n^\phi, \hat{\Sigma}^\phi(F_n))$ of a scatter matrix to construct a confidence ellipsoid: $Q_{II} = \{X_i \in R^P | (X_i-\hat{\mu}_n^\phi)^T\{\hat{\Sigma}^\phi(F_n)\}^{-1}(X_i-\hat{\mu}_n^\phi) \leq \chi_\alpha^2(p)\}$; where $\chi_\alpha^2(p)$ is the $(1-\alpha) \times 100\%$ quantile of distribution $\chi^2-$, and the constant $\alpha$ is 0.05 or 0.01;
  $S_{IIS} = S_{II} \cap Q_{II}, S_{IIA} = S_{II} - S_{IIS}$.

6. The method according to claim 5, wherein the preset outlier-tolerant proportional compression algorithm specifically comprises:

$$\tilde{X}_i = \hat{\mu}_n^\phi + \frac{X_a^2(p)}{(X_i - \hat{\mu}_n^\phi)^T\left\{\hat{\sum}^\phi(F_{n_2}^b)\right\}^{-1}(X_i - \hat{\mu}_n^\phi)}(X_i - \hat{\mu}_n^\phi).$$

7. A passive outlier-tolerant and active outlier-tolerant learning system with abnormal samples, comprising:
  one or more processors;
  a. an acquiring module executed by the one or more processors to acquire a train set and a test set;
  b. an outlier-tolerant learning module executed by the one or more processors to judge a distribution of abnormal samples in the train set, and call a corresponding outlier-tolerant algorithm based on the distribution to carry out feature learning on a sample feature quantity in the train set to obtain an outlier-tolerant learning result;
  c. a training module executed by the one or more processors to train an initial learning model by using the outlier-tolerant learning result to obtain an intermediate learning model;
  d. an outlier-correcting module executed by the one or more processors to process the test set by a preset outlier-correction algorithm to obtain an outlier-corrected test set; and
  e. a testing module executed by the one or more processors to test the intermediate learning model using the outlier-corrected test set to obtain a final learning model;
  wherein calling a corresponding outlier-tolerant algorithm based on the distribution to carry out feature learning on the sample feature quantity in the train set specifically comprises the following steps:
  if the distribution of abnormal samples is unknown, calling the passive outlier-tolerant algorithm to carry out feature learning on the sample feature quantity;
  if the distribution of abnormal samples is known, calling the active outlier-tolerant algorithm to carry out feature learning on the sample feature quantity;
  wherein the passive outlier-tolerant algorithm specifically comprises the following steps:
  constructing an M-learning mechanism, wherein the M-learning mechanism comprises a function binary group;
  constructing a function binary group with outlier tolerance to abnormal information brought by abnormal samples;
  solving an optimal outlier-tolerant estimator based on the M-learning mechanism for the feature quantity in the train set $S_1$;
  wherein the M-learning mechanism is:

$$\begin{cases} \sum_{i=1}^n \phi_\mu\left(d^2\left(X_i, \hat{\mu}_n^\phi, \hat{\sum}_n^\phi\right)\right)(X_i - \hat{\mu}_n^\phi) = 0 \\ \sum_{i=1}^n \phi_\eta\left(d^2\left(X_i, \hat{\mu}_n^\phi, \hat{\sum}_n^\phi\right)\right)(X_i - \hat{\mu}_n^\phi)(X_i - \hat{\mu}_n^\phi)^T = n\hat{\sum}_n^\phi \end{cases};$$

where $d^2(X, \mu, \Sigma) = (X-\mu), \Sigma^{-1}(X-\mu)$, $\{\phi_\mu, \phi_\eta\}$ is a real function binary group on $R^+ = [0, +\infty)$; and
the function binary group with outlier tolerance is:

$$\phi_\mu(r) = \begin{cases} 1, & r \in [0, r_0] \\ \frac{c-r}{c-r_0}, & r \in (r_0, c] \\ 0, & r > c \end{cases}; \phi_\eta(r) = \begin{cases} 1, & r \in [0, r_0] \\ \frac{r_0 c}{c-r_0}\left(\frac{1}{r} - \frac{1}{c}\right), & r \in (r_0, c] \\ 0, & r > c \end{cases};$$

where $r_0$ and c are adjustable parameters, and the default values are $r_0 = 3p$, $c = 3r_0$.

* * * * *